United States Patent [19]

Booth, Jr.

[11] Patent Number: 5,351,923
[45] Date of Patent: Oct. 4, 1994

[54] PORTABLE CAMERA SUPPORT

[76] Inventor: Thorald L. Booth, Jr., 4545 Tallmadge Rd., Rootstown, Ohio 44272

[21] Appl. No.: 176,838

[22] Filed: Jan. 3, 1994

[51] Int. Cl.$^5$ .............................................. A47B 96/06
[52] U.S. Cl. ................... 248/217.1; 211/107
[58] Field of Search ............ 248/217.1, 216.1, 216.4, 248/217.4, 219.4, 218.4, 231; 211/107; 354/293

[56] References Cited

U.S. PATENT DOCUMENTS

| | | | |
|---|---|---|---|
| 704,666 | 7/1902 | Stephens | 248/217.4 X |
| 993,614 | 5/1911 | Mueller et al. | 238/217.4 |
| 1,090,836 | 3/1914 | Bush | 248/217.1 X |
| 1,170,096 | 2/1916 | Nicholson | 248/217.1 X |
| 1,237,428 | 8/1917 | Watrous | 248/217.1 |
| 1,582,381 | 4/1926 | Citero | 248/217.4 |
| 4,744,537 | 5/1988 | Buckley | 248/219.4 |

FOREIGN PATENT DOCUMENTS 125603  4/1928  Switzerland ................. 248/217.1

Primary Examiner—J. Franklin Foss
Attorney, Agent, or Firm—Thomas N. Neiman

[57] ABSTRACT

The novel portable camera support is comprised of an unit that is capable of being attached to a post or a tree and provide a stable platform for a camera. This device consists of a horizontal support platform that has, at one end, an attachment unit which can be connected to the camera. The opposite end of the support platform contains a screw that can be inserted into the tree or post. An angled support piece is pivotally attached to the horizontal support platform and contains a angled spike. The angled support piece is hollowed out to allow the unit to be rotated to fit over the horizontal support for ease of carrying when the device is not being used. An alternative embodiment is also disclosed that can be attached to the tree or post without being screwed into the tree.

2 Claims, 2 Drawing Sheets

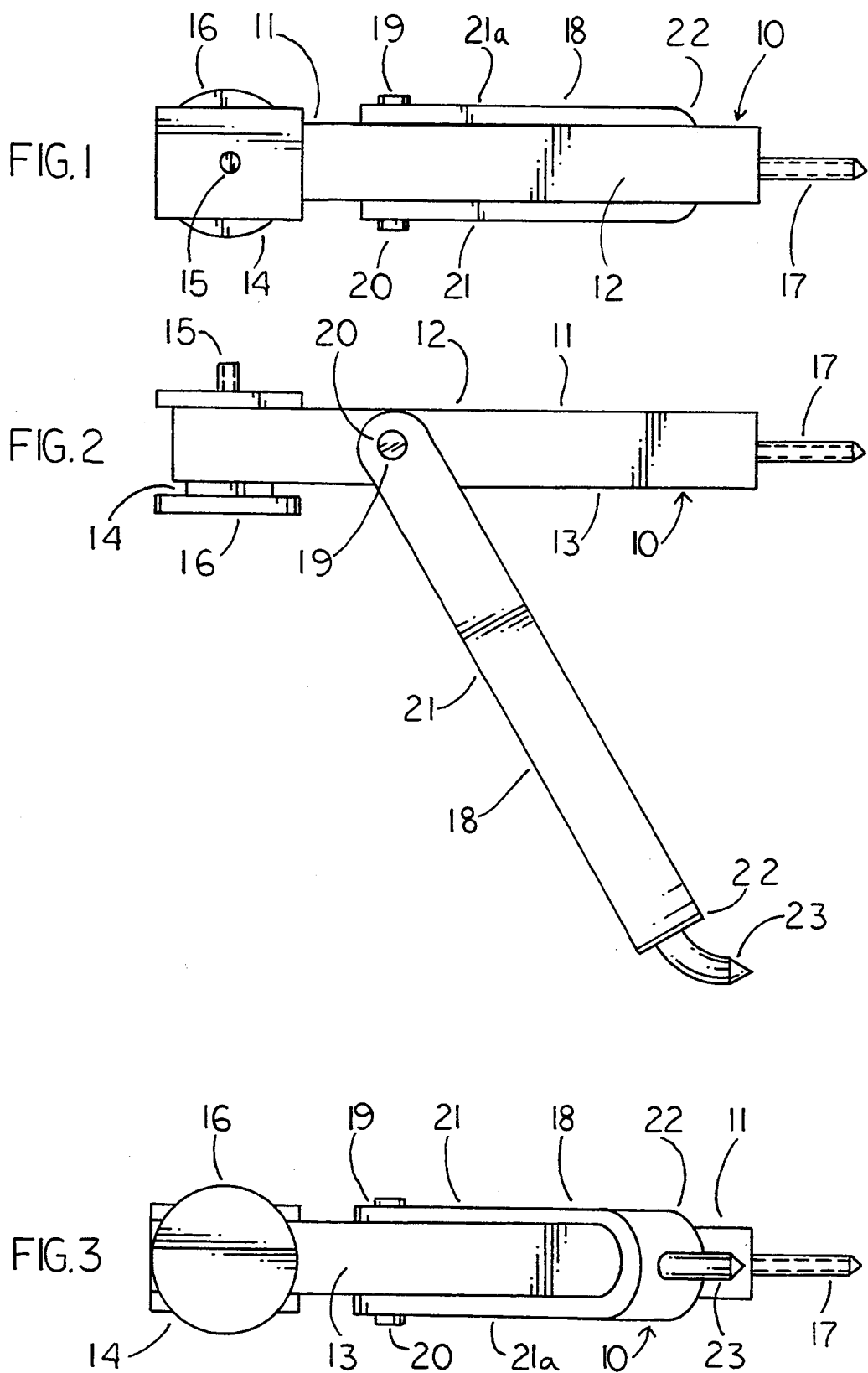

PORTABLE CAMERA SUPPORT

BACKGROUND OF THE INVENTION

This invention pertains to camera accessories, and, in particular, to a portable camera support for outdoor use this support can be attached to a post or a tree and allows the user to take self portraits, group photographs, or in situations where typical tripods are not suitable.

Many types and designs of tripods are currently on the market. The typical camera tripod is too big and / or too heavy to be easily carried on back packing excursions. Examples of these tripods include the U.S. Pat. No. 1,211,347 to Plotchan and Zuraw for a Camera Support, issued on Jan. 2, 1917 and the U.S. patent issued to Bowen and Harmon, U.S. Pat. No. 681,614 for a Support For Cameras or Photographic Apparatus issued on Aug. 27, 1901. Both of these devices are support units for cameras, but neither would be suitable for backpacking situations because they are too heavy, cumbersome, or they would not fold into a streamlined small package to be easily packed and carried. What is needed is a lightweight camera support that an individual can easily fold and store and, at the same time, be readily accessible for use quickly and simply.

Clearly, it is desirable for a device of this type to be very lightweight and flexible. At the same time, the device should be easy to manufacture and be produced of one, common inexpensive material. It is an object of this invention to set forth a portable camera support which avoids the disadvantages, previously mentioned limitations of typical camera tripods.

SUMMARY OF THE INVENTION

Particularly, it is the object of this invention to set forth a portable camera support, for use in providing a stable camera support in outdoor settings, comprising a horizontal support platform; said horizontal support platform having camera connection means positioned at one end of said camera support platform for permitting a camera to be connected to said horizontal support platform; said horizontal support platform further having means for attaching said horizontal support platform to a tree or a post; an angled support piece; said angle support piece having pivot means positioned at one end of said angled support piece for permitting a rotatable connection to said horizontal support platform; said angled support piece further having a hollowed middle portion for receiving said horizontal support platform when said angled support piece is rotated upward for creating a small portable device; and said angled support piece further having an arcuate protrudence extending from the end of said angled support piece opposite said pivot means.

BRIEF DESCRIPTION OF THE INVENTION

Further objects and features of this invention will become more apparent by reference to the following description taken in conjunction with the accompanying figures, in which:

FIG. 1 is a top plan view of the novel portable camera support;

FIG. 2 is a side elevational view thereof;

FIG. 3 is a bottom plan view thereof;

DESCRIPTION OF THE PREFERRED EMBODIMENTS

Figure 4:
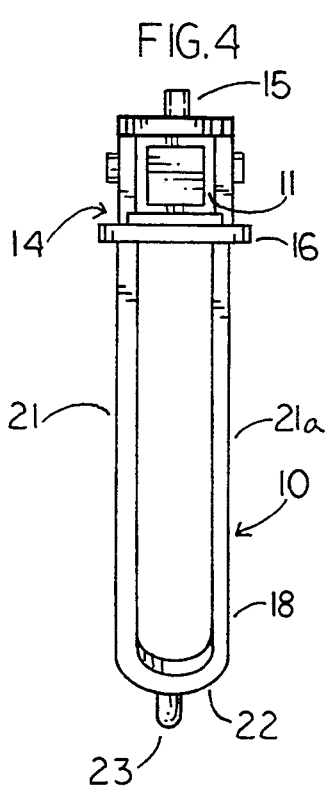
FIG. 4 is a front elevational view thereof.
Figure 5:
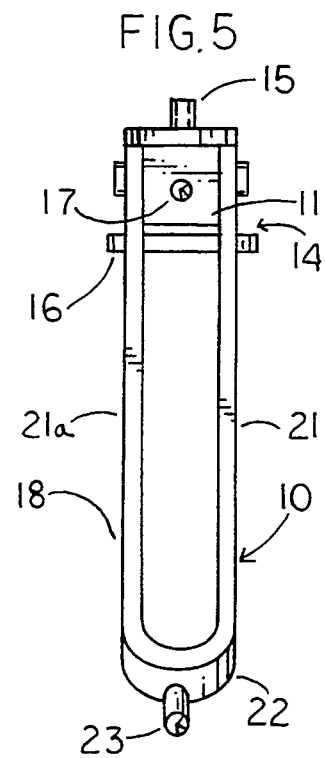
FIG. 5 is a rear elevational view thereof.
Figure 6:
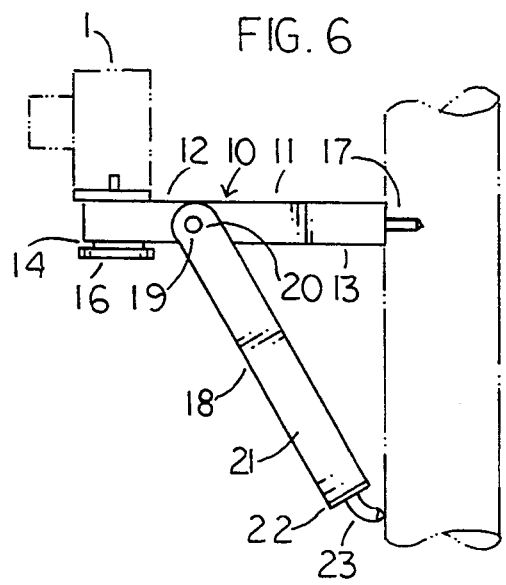
FIG. 6 is a perspective view of the novel camera support position on a tree or post.

As shown in the figures, the novel portable camera support 10 comprises a horizontal support platform 11 that is shaped in the form of a rectangular block having a flat top 12 and bottom 13 surfaces, At one end of the platform 11 is a camera connection system 14 that comprises a threaded rod 15 that, is controlled by a rotation knob 16. The threaded rod 15 is inserted into the receiving slot in the base of the camera 1 and the knob is turned tightening the camera in position. At the opposite end of the horizontal support platform 11 is a screw 17 that is designed to be screwed into the tree or pole. An angled support piece 18 is pivotably connected to the horizontal support platform 11. The connection is made by means of apertures 19 in the horizontal support platform 11 and the angled support piece 18. A pivot pin 20 is inserted through the aperture 19 which allows the angled support piece 18 to rotate upward when the device 10 is not in use. The angled support piece 18 consists of parallel vertical sides 21 and 21a that have a curved end portion 22. The area between the two parallel sides is open to allow the sides to encompass the horizontal support platform 11 and allow the device 10 to folded into a single straight unit for transport in a carrying case or a pocket. Extending from the curved end 22 of the angled support piece 18, is an arcuate spike 23 that is designed to provide additional support for the device 10 when the weight of the camera 1 is on the device 10.

Figure 7:
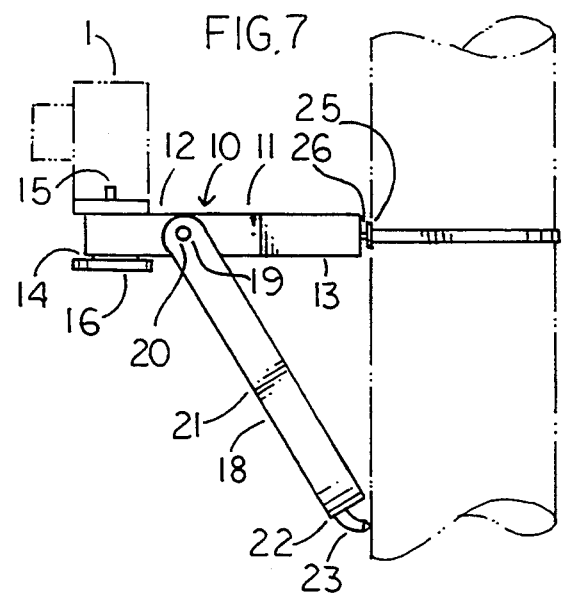
FIG. 7 is a perspective view of an alternative embodiment thereof.

The alternative embodiment, as shown in FIG. 7, comprises a strap 24 and receiving unit 25 that has a female receiver 26 into which the screw 17 can be positioned so that the device does not have to be screwed into a pole or tree or can be used around any surface harder than a wood log - for instance a cement pillar.

In use, the individual setting up the camera would unfold the device and screw it into the pole or tree or into the receiving unit so that the horizontal support platform level. The angled support can be used to adjust the level of the horizontal platform (within limits). The camera is fitted onto the threaded rod 15 and the knob turned to tighten the camera onto the device. This device is designed to support any camera or video equipment.

While I have described my invention in connection with specific embodiments thereof, it is clearly to be understood that this is done only by way of example and not as a limitation to the scope of my invention as set forth in the objects thereof and in the appended claims.

I claim:

1. A portable camera support, for use in providing a lightweight stable camera platform while in outdoor settings, comprising:

a horizontal support platform;

said horizontal support platform comprising a lightweight, rectangular block;

said horizontal support platform having a pivot aperture positioned in said horizontal support platform;

said horizontal support platform further having camera connection means positioned at one end of said horizontal support platform for permitting a camera to be connected to said horizontal support platform;

said camera connection means comprising a rotatable threaded rod for insertion into the female receiving slot of the camera;

said rotatable threaded rod having a control knob;

said horizontal support platform further having means for attaching said horizontal support platform to a tree or a post;

said attaching means comprising a threaded screw;

an angled support piece;

said angled support piece comprising a lightweight material in an elongated U shaped configuration;

said angled support piece further comprising twin parallel, vertical sides;

said angled support piece having pivot means positioned at one end of said angled support piece for permitting a rotatable connection to said horizontal support platform;

said angled support piece further having apertures adjacent to the upper portion of said twin parallel, vertical sides for receiving said pivot means;

said angled support piece further having a hollowed middle portion for receiving said horizontal support platform when said angled support piece is rotated upward for creating a small portable device; and said angled support piece further having an arcuate protrudence extending from the end of said angled support piece opposite said pivot means.

2. A portable camera support, according to claim 1, wherein:

said pivot means comprises a pivot pin inserted into said apertures in said horizontal support platform and said angled support piece.

* * * * *